United States Patent
Zylberberg et al.

(10) Patent No.: US 10,834,320 B1
(45) Date of Patent: Nov. 10, 2020

(54) TRIPLE-MODE CAMERA SYSTEM AND METHOD OF USING THE SAME

(71) Applicant: EMZA VISUAL SENSE LTD, Givatayim (IL)

(72) Inventors: Yoram Zylberberg, Tel Aviv (IL); Elad Baram, Shilat (IL); Tomer Kimhi, Tel Aviv (IL)

(73) Assignee: EMZA VISUAL SENSE LTD, Givatayim (IL)

( * ) Notice: Subject to any disclaimer, the term of this patent is extended or adjusted under 35 U.S.C. 154(b) by 0 days.

(21) Appl. No.: 16/706,875

(22) Filed: Dec. 9, 2019

(51) Int. Cl.
*H04N 5/232* (2006.01)

(52) U.S. Cl.
CPC ............... *H04N 5/23245* (2013.01)

(58) Field of Classification Search
CPC ............ H04N 5/23245; H04N 5/2352; H04N 1/32128; H04N 13/178
See application file for complete search history.

(56) References Cited

U.S. PATENT DOCUMENTS

| | | | | |
|---|---|---|---|---|
| 5,499,069 A * | 3/1996 | Griffith | ............ | G02B 15/08 348/E5.024 |
| 6,714,724 B1 * | 3/2004 | Cook | ............ | H04N 5/2251 348/373 |
| 2002/0008778 A1 * | 1/2002 | Grigorian | ............ | H04N 7/084 348/484 |
| 2009/0066790 A1 * | 3/2009 | Hammadou | ..... | G08B 13/19636 348/143 |
| 2009/0153692 A1 * | 6/2009 | Koide | ............ | H04N 1/00347 348/222.1 |
| 2012/0099832 A1 * | 4/2012 | Gupta | ............ | G11B 27/105 386/230 |
| 2016/0065908 A1 * | 3/2016 | Chang | ............ | G06F 21/79 348/158 |
| 2016/0275641 A1 * | 9/2016 | Bostick | ............ | G11B 27/031 |
| 2018/0234643 A1 * | 8/2018 | Kobayashi | ............ | G01J 5/10 |
| 2018/0336669 A1 * | 11/2018 | Mertens | ............ | G09G 5/026 |
| 2019/0139502 A1 * | 5/2019 | Onozawa | ............ | G09G 5/10 |
| 2019/0222756 A1 * | 7/2019 | Moloney | ............ | G06K 9/209 |

* cited by examiner

*Primary Examiner* — Amy R Hsu
(74) *Attorney, Agent, or Firm* — Soroker Agmon Nordman

(57) ABSTRACT

A capture device and method, the capture device comprising: a camera ensemble, comprising one or more cameras, the camera ensemble adapted to obtain high resolution images and low resolution images; one or more processors configured to receive the high resolution images and the low resolution images from the camera ensemble and process the high resolution images and the low resolution images, and to output images or metadata; and a three-way switch, having an "off" state, an "auto" state and a "stream" state, wherein when the three-way switch is in "Off" state, no image or metadata is output by the processor, when the three-way switch is in "Auto" state, only metadata is output by the processor, and when the three-way switch is in "Stream" state, metadata and high resolution images can be output by the processor.

18 Claims, 3 Drawing Sheets

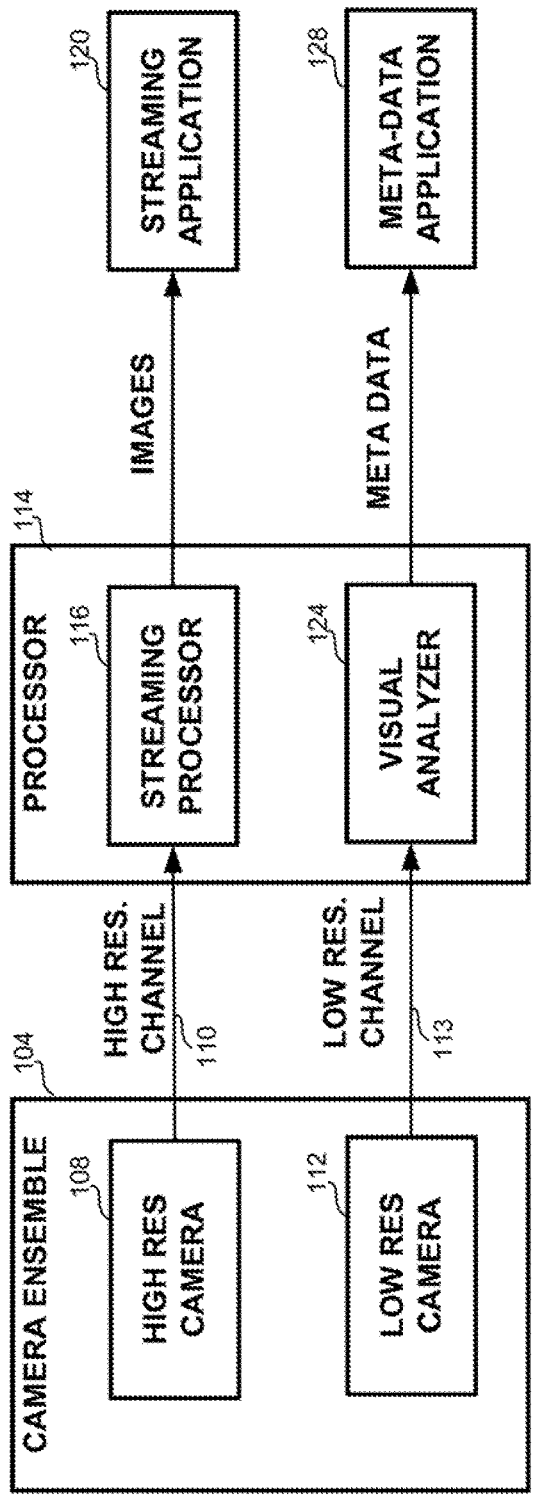
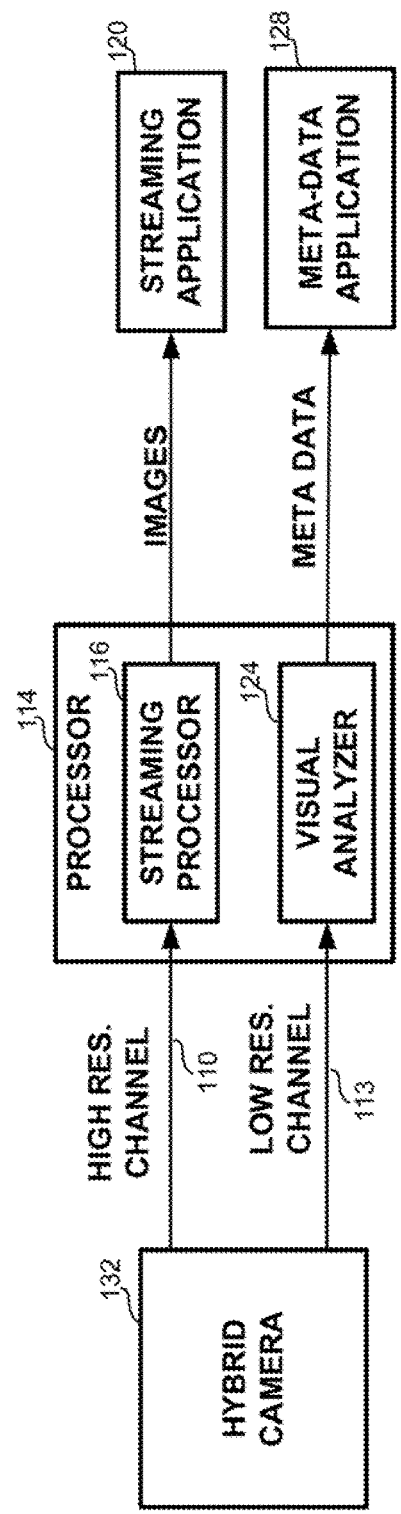

TRIPLE-MODE CAMERA SYSTEM AND METHOD OF USING THE SAME

TECHNICAL FIELD

The present disclosure relates to capture devices in general, and to a privacy protecting triple mode visual sensor, in particular.

BACKGROUND

Nowadays many devices and application modules comprise and use cameras for multiple user applications and uses, including security, photography, teleconferencing, social networks activities, entertainment, or the like. In particular, cameras are contained in and used by mobile devices such as mobile phones, laptops, tablets, or the like.

Among the variety of uses and applications of a camera installed in mobile devices, one important set of uses includes using captured images for resolving security or privacy issues, for example face recognition for granting access, detecting the presence of a human face and dimming the screen brightness when no one is looking, stopping or starting a video based on gaze detection, turning the screen off when someone is looking over a user's shoulder, or the like. A different set of uses includes streaming captured images, for example in video chats, video conferences, broadcasting, or the like.

Once it is enabled to output or even stream from the device images captured by a camera of the device, the possibility arises of using such images for malicious purposes, thus harming the privacy or security of the user or the device. For example, an image captured during a teleconference or for the purpose of face recognition, can be seized by a malicious party, and used for obtaining access to the device, or to other devices to which the user has access at a later time, or compromising images or videos of the user can be used for malicious intents.

BRIEF SUMMARY

One exemplary embodiment of the disclosed subject matter is a capture device, comprising: a camera ensemble, comprising one or more cameras, the camera ensemble adapted to obtain high resolution images and low resolution images; one or more processors configured to receive the high resolution images and the low resolution images from the camera ensemble and process the high resolution images and the low resolution images, and to output images or metadata; and a three-way switch, having an "Off" state, an "Auto" state and a "Stream" state, wherein when the three-way switch is in "Off" state, no image or metadata is output by the processor, when the three-way switch is in "Auto" state, only metadata is output by the processor, and when the three-way switch is in "Stream" state, metadata and high resolution images can be output by the processor. Within the device, the "Auto" state is optionally a default state of the three-way switch. Within the device, the "Off" state is optionally physically located as a middle state of the three-way switch, between the "Auto" state and the "Stream" state. The device may further comprise an indicator, wherein the indicator is active when the three-state switch is in the "Auto" state. Within the device, the indicator is optionally visual. Within the device, the indicator is optionally a Light Emitting Diode (LED). Within the device, in the "Off" state a physical shutter optionally covers the camera ensemble of part thereof. Within the device, in the "Off" or "Auto" state a physical shutter optionally covers the camera ensemble of part thereof. Within the device, in the "Off" state or "Auto" state, optionally no access is enabled to a memory device of the capture device. Within the device, in the "Auto" state, a controller of the processor optionally sets parameters such that the processor cannot output images nor data sufficient for reconstructing images. Within the device, in the "Off" state, a controller of the processor optionally sets parameters such that the processor cannot output data, nor images, nor data sufficient for reconstructing images. Within the device, the metadata is optionally used for an operation selected form the group consisting of: dimming a display of the capture device, brightening a display of the capture device, turning a video on or off, blocking a person other than a user from gazing at a screen of the display device.

Another exemplary embodiment of the disclosed subject matter is a method for operating a capture device, comprising: obtaining a high resolution image or a low resolution image; obtaining a state of a three-way switch; subject to the state being an "Off" state, disabling all output from the capture device; subject to the state being an "Stream" state, enabling all output from the capture device, including the high resolution image; and subject to the state being an "Auto" state, enabling only metadata output from the capture device, and disabling outputting images from the device. The method can further comprise: turning on a LED when the switch is in "Stream" state; and turning off the LED when the switch is in "Off" state or "Auto state". Within the method, in the "Off" state a physical shutter optionally covers the camera ensemble of part thereof. Within the method, the "Auto" state is optionally a default state of the three-way switch. Within the method, the "Off" state is optionally physically located as a middle state of the three-way switch, between the "Auto" state and the "Stream" state. Within the method, the metadata is optionally used for an operation selected form the group consisting of: dimming a display of the capture device, brightening a display of the capture device, turning a video on or off, blocking a person other than a user from gazing at a screen of the display device.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 1A is a schematic illustration of an exemplary embodiment of a visual sensor and applications using images captured and processed by the visual sensor;

FIG. 1B is a schematic illustration of another exemplary embodiment of a visual sensor and applications using images captured and processed by the visual sensor;

DETAILED DESCRIPTION

Figure 2:
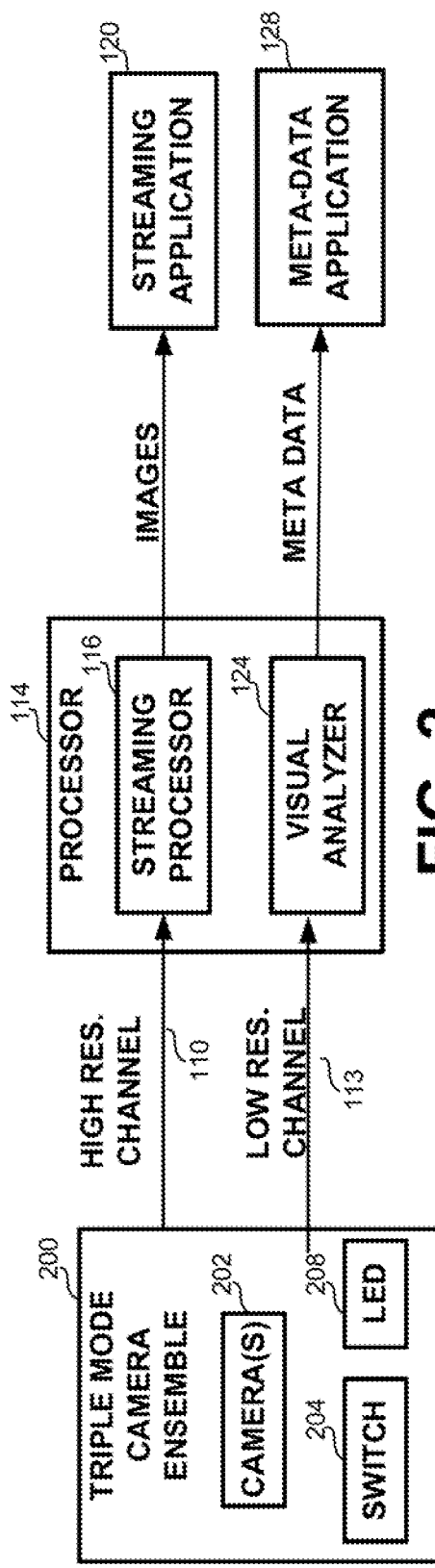
FIG. 2 is a schematic illustration of an embodiment of a visual sensor, in accordance with some exemplary embodiments of the disclosed subject matter.

Unless specifically stated otherwise, the term "image" used in the specification should be expansively construed to cover any non-destructive capturing of an object, including, but not limited to, capturing by an optical device using any wavelength range(s), including still images, video frames, video clips, or the like.

One technical problem of the disclosure is that computing devices, such as mobile computing devices, which comprise cameras, are subject to seizing images captured for specific purposes, such as but not limited to teleconferencing or security purposes, for malicious purposes.

Thus, the security of a device capable of outputting images and hence the privacy of the user may be compromised by captured images being output from the device, hijacked and used for malicious purposes, such as obtaining access to the device or to another device associated with the same user.

Thus, users may be so concerned about their privacy being compromised, that they may even avoid purchasing laptops with cameras, or shield the camera with opaque tape, thus prohibiting the use of the advanced features and applications which are otherwise desired and appealing.

One technical solution comprises operating one or more cameras of the device in one of three possible states. The first mode is an "Off" state, in which no images or data can be output by the capturing and analysis system, the system also referred to as a visual sensor. The second mode is an "Auto" state, also referred to as "Safety" state or "Data" state, which enables only meta data to be output from the visual sensor, such as whether a user as identified, where their gaze is directed to, whether there is one or more than one person in front of the camera, or the like, but no images are output, nor data from which an image may be reconstructed. The third mode is a "Stream" state, or a "Full" state, in which images may be output from the camera ensemble, for example during a teleconference. The user may thus usually keep the device with the visual sensor in "Off" state to ensure that nothing is output by the camera, or in "Auto" state, to ensure that no image is output but useful purposes such as identification may be fulfilled, and only when streaming is required, to switch to "Stream" state, and then switch back to "Off" state or "Auto" state.

Another technical solution comprises a three-way switch of the camera ensemble or the visual sensor, which enables a user to set the state of the switch and thus select the mode at which the ensemble operates. In some embodiments, the switch may be set by default to "Auto" state, to enable identification or other operations without the risk of hijacking of images. In some embodiments, the "Off" state may be physically a middle state, which is harder to switch to, such that the user can more easily select the "Auto" state and the "Streaming" state, and will not switch to "Off" by accident, thus disabling identification and the advanced applications dependent upon it, or other features.

Yet another technical solution comprises a visual notification, such as a LED which is turned on when the visual sensor is streaming images, or even when the switch is in "Stream" state even if no images are transmitted, in order to remind the user to switch to a safer state when streaming is no longer required.

Yet another technical solution comprises disabling the device from outputting images or information that enable reconstruction of images in "Auto" state or in "Off" state. Disabling may be performed by blocking the high resolution channel through which high resolution images are transferred to processing, and governing the parts of the main controller of the visual sensor, which is responsible for processing the low resolution images, wherein the controller is the only source that can provide data to the output interface of the chip. The controller may limit the volume of data that is output per each captured image in "Auto" state, so that only a small number of bits of the image may be output, which are insufficient for reconstructing the image, and in particular in high resolution. Additionally or alternatively, the controller may limit the output to indications provided by of one or more analysis engines, such as an identity of a captured person, number of captured persons, or the like.

The output may be limited by etching or hard coding into the camera processor the controller that maintains one or more output limitations, such that the controller cannot be replaced or updated. The controller may be implemented in hardware. Alternatively, the controller may be configurable to the specific device it is installed in and specific needs, but locked once installed, using for example an e-fuse mechanism, such that it cannot be replaced or hacked. Further components of a processor of the visual sensor, such as one or more of the camera interface, the output interface, or any of the analysis engines, may also be hard coded and thus configurable once (or another predetermined number of times). In further embodiments, one or more of these components may be hard coded, but may access parameters or other settings which are configurable, such that the behavior of the corresponding component may be changed although the component itself is not changed. In further embodiments, the volume of data per image which may be output by the output interface may be limited. The controller may limit the number of times any one or more components can access the image memory per captured image, such that only a predetermined number of bits can be output. Further attempts by any of the other components to access the image memory, will result in accessing the next captured image, such that the number of bits output of the same image is limited, and is insufficient for reconstructing the image, particularly at high resolution.

Referring now to FIG. 1A and FIG. 1B, showing schematic exemplary embodiments of visual sensors, and applications using images captured and processed by the visual sensor. FIG. 1A shows a two-camera sensor, comprising a camera ensemble 104. Camera ensemble 104 comprises a high resolution camera 108, used for example for applications such as taking photos, taking video clips, teleconferencing, broadcasting, or the like. Camera ensemble 104 comprises a low resolution camera 112, used for example for applications such as security or privacy, access control, gaze estimation, estimation of age of user by their face, recognition of another person "looking over the shoulder" of the user, or the like. Images captured by high resolution camera 108 may be transferred on high resolution channel 110 to processor 114, and images captured by low resolution camera 112 may be transferred on high resolution channel 113 to processor 114.

Processor 114 may process differently high resolution images and low resolution images. For example, high resolution images may undergo streaming processing by streaming processor 116, used for example for compressing or encrypting the images or performing any other operation, before passing the images, or parts thereof from which the images may be constructed to one or more streaming applications 120, such as teleconferencing or broadcasting applications. Low resolution images may undergo visual analysis by visual analyzer 124, used for example for determining the identity of a captured person, determining the number of persons captured in an image, or the like. Meta data obtained by visual analyzer 124, such as the identity or features of a captured person, number of captured persons or other details, from which the images cannot be constructed, may be provided to one or more meta data applications 128, such as access control applications, privacy applications, or the like. It will be appreciated that streaming processor 116 and visual analyzer 124 may be implemented as a single chip or chipset (also referred to as one or more modules), in which one or more components may be shared between the two functionalities FIG. 1B shows a slightly different configuration, in which instead of camera ensemble 104, there is a single hybrid camera 132 instead of high resolution camera 108 and low resolution camera 112. However, the other components of the system, including high resolution channel 110, low resolution channel 113 and processor 114 outputting images or meta data to the corresponding applications may be implemented in a similar manner to FIG. 1A.

Referring now to FIG. 2, showing a schematic exemplary embodiment of a visual sensor in accordance with the disclosure, and applications using its output.

The visual sensor comprises a triple mode camera ensemble 200, which may be implemented as a common housing comprising high resolution camera 108 and low resolution camera 112 as shown in FIG. 1A above, or a hybrid camera 132, as shown in FIG. 1B above. In either case, camera ensemble 200 may comprise a three-way switch 204 and a visual indicator, such as a Light Emitting Diode (LED) 208, detailed below.

Figure 3:
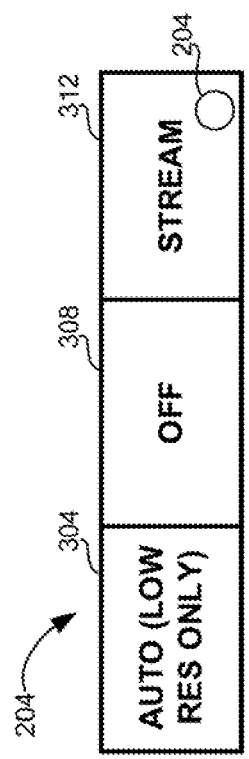
FIG. 3 is a schematic illustration of possible operational states of a three-way switch, in accordance with some exemplary embodiments of the disclosed subject matter.

Referring now also to FIG. 3, showing the possible operational states of three-way switch 204. Three-way switch 204 may be at an "Auto" state 304, in which only low resolution images captured by a low resolution camera or by a hybrid camera capturing in low resolution, may be provided to processor 204. When the switch is in this state, no image captured in high resolution, whether by a high resolution camera or by a hybrid camera, may be provided to processor 114. In further embodiments, high resolution images may be provided to processor 114, but no images nor information from which the images may be constructed may be output by processor 114.

Three-way switch 204 may also be at an "Off" state 308 in which no image can be provided to processor 114 or output from processor 114. Three-way switch 204 can also be in a "Stream" state 312 in which all images are provided to processor 114, data may be provided to meta data application 128, and high resolution images may be provided to streaming applications 120.

In some embodiments, three-way switch 204 may be designed such that the "Off" state which is usually not used, since a person may want to be approved by access control or similar purposes, is physically located as a middle state between the "Auto" state and the "Stream" state, making it harder to be placed in this position accidentally.

In some embodiments, the default state of switch 204 may be the "Auto" state, in which the user's access may be controlled and approved, but no images are output.

LED 208 or another indicator, such as visual, audio or another) may be turned on whenever three-way switch 204 is in "Stream" mode 312, such that a user may easily notice that the device is outputting images, and switch to a different state to protect her privacy when it is no longer required to output high resolution images.

Three-way switch 204 may be implemented as a mechanical switch, electronic switch, a touch pad in which each area is associated with one state, a gesture based switch, voice activated switch, or in any other manner.

In some embodiments, three-way switch 204 may cause an opaque physical cover, electronic or another mechanism to disable capturing or transmitting from the high resolution lens in "Auto" mode, and the high resolution and low resolution lenses in "Off" mode.

In further embodiments, in "Auto" state, three-way switch 204 may disable high resolution channel 110, and in "Off" mode may disable high resolution channel 110 and low resolution channel 113.

In yet further embodiments, three-way switch 204 may cause a controller of the processor to set a relevant parameter accessed by components of processor 114, such that processor 114 will block images from being output in "Auto" mode, or block images and metadata from being output in "Off" mode.

The output metadata can be used for purposes such as but not limited to: allowing or forbidding access to the device or some of its functions or files; dimming a display of the capture device, brightening a display of the capture device, turning a video on or off, blocking a person other than a user from gazing at a screen of the display device, or the like.

In some embodiments, blocking processor 114 from outputting images may be implemented by governing a controller comprised in processor 114, responsible for processing the high resolution images, wherein the controller or components activated by the controller are the only components that can access the camera and output data to the applications. The processor may limit the volume of data that is output per each captured image in "Auto" state, so that only a small number of bits of the image may be output, which are insufficient for reconstructing the image, and in particular in high resolution. Additionally or alternatively, the processor may limit the output to indications provided by one or more analysis engines, such as an identity of a captured person, number of captured persons, or the like. The output may be limited by etching or hard coding into the processor a controller that maintains one or more output limitations, such that the controller cannot be replaced or updated. The controller may be implemented in hardware. Alternatively, the controller may be configurable to the specific unit and specific needs, but locked once installed, using for example an e-fuse mechanism, such that it cannot be replaced or hacked. Further components of the processor, such as one or more of the camera interface, the output interface, or any of the analysis engines, may also be hard coded and thus configurable once (or another predetermined number of times) or non-replaceable. In further embodiments, one or more of these components may be hard coded, but may access parameters or other settings which are configurable, such that the behavior of the corresponding component may be changed although the component itself is not changed. In further embodiments, the volume of data per image which may be output by the output interface may be limited. The controller may limit the number of times any one or more components can access the image memory per captured image, such that only a predetermined number of bits can be output. Further attempts by any of the other components to access the image memory, will result in accessing the next captured image, such that the number of bits output of the same image is limited, and is insufficient for reconstructing the image, particularly at high resolution. Such embodiments for disabling outputting images are described in US Patent Application titled "Privacy Proof Visual Sensor", filed concurrently with and assigned to the same assignee as the current application.

Figure 4:
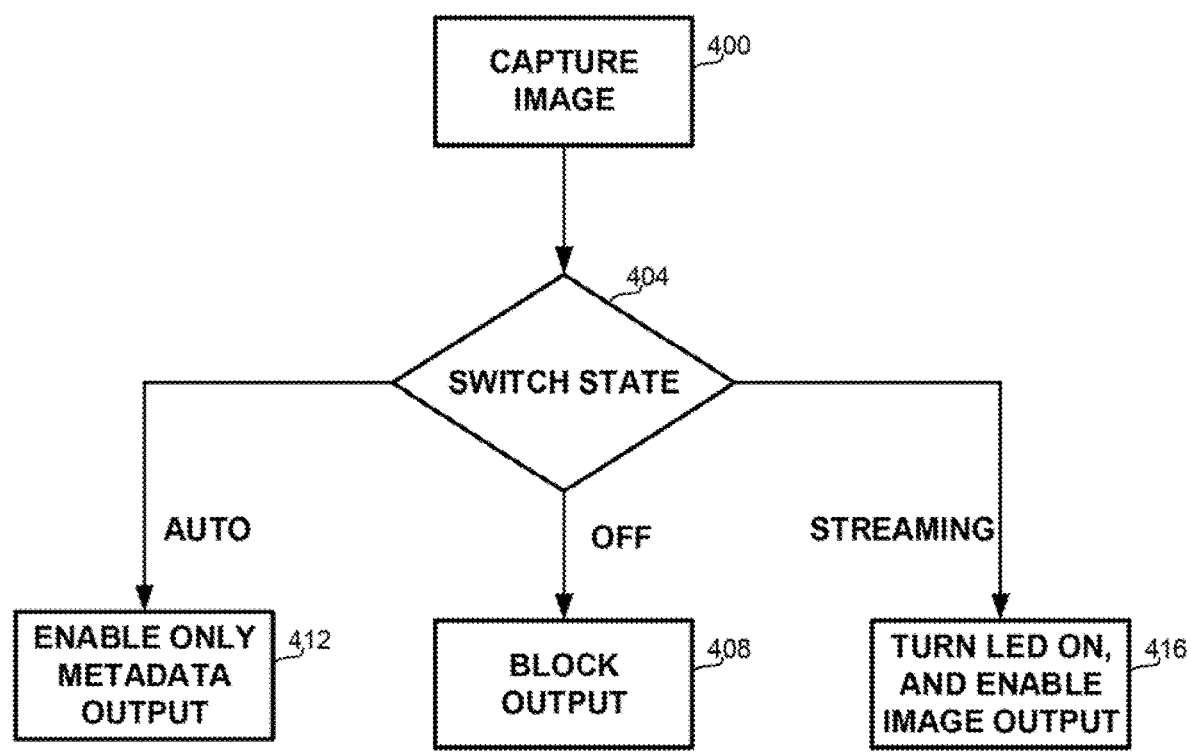
FIG. 4 is a flowchart of a method for using a triple-mode camera, in accordance with some exemplary embodiments of the disclosed subject matter.

Referring now to FIG. 4, showing a flowchart of steps in a method for using a triple-mode camera, in accordance with the disclosure.

On step 400, an image may be captured by a hybrid camera 132 or by one of a low resolution camera 108 or high resolution camera 112.

On step 404, a state of a three-way switch comprising in the camera may be tested.

If the switch is in "Off" mode, then on step 408 all output is locked from the camera or camera ensemble, or from processor 114, such that no data or image is provided to any of the applications associated with the images, such as streaming application 120.

If the switch is in "Auto" mode, then on step 412 no images or data that enables the reconstruction of images are output by the camera or camera ensemble, or from processor 114, such that no images are provided to or can be reconstructed by any of the applications associated with the images.

If the switch is in "Stream" mode, then on step 416 all functionality may be enabled, images may be processed and output as desired. In addition, LED 208 may be turned on, and then turned off when streaming is done.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as Python, MATLAB, the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A capture device, comprising:
   a camera ensemble, comprising at least one camera, the camera ensemble adapted to obtain high resolution images and low resolution images;
   at least one processor configured to receive the high resolution images and the low resolution images from the camera ensemble and process the high resolution images and the low resolution images, and to output images or metadata; and
   a three-way switch, having an "Off" state, an "Auto" state and a "Stream" state, wherein when the three-way switch is in "Off" state, no image or metadata is outputted by the processor,
   when the three-way switch is in "Auto" state, only metadata resulting from the high resolution images and/or low resolution images is outputted by the processor, and
   when the three-way switch is in "Stream" state, metadata resulting from the high resolution images and/or low resolution images and high resolution images can be outputted by the processor.

2. The capture device of claim 1, wherein the "Auto" state is a default state of the three-way switch.

3. The capture device of claim 1, wherein the "Off" state is physically located as a middle state of the three-way switch, between the "Auto" state and the "Stream" state.

4. The capture device of claim 1, further comprising an indicator, wherein the indicator is active when the three-state switch is in the "Stream" state.

5. The capture device of claim 4, wherein the indicator is visual.

6. The capture device of claim 5, wherein the indicator is a Light Emitting Diode (LED).

7. The capture device of claim 1, wherein in the "Off" state a physical shutter covers the camera ensemble of part thereof.

8. The capture device of claim 1, wherein in the "Off" or "Auto" state a physical shutter covers the camera ensemble of part thereof.

9. The capture device of claim 1, wherein in the "Off" state or "Auto" state no access is enabled to a memory device of the capture device.

10. The capture device of claim 1, wherein in the "Auto" state, a controller of the processor sets parameters such that the processor cannot output images nor data sufficient for reconstructing images.

11. The capture device of claim 1, wherein in the "Off" state, a controller of the processor sets parameters such that the processor cannot output data, nor images, nor data sufficient for reconstructing images.

12. The capture device of claim 1, wherein the metadata is used for an operation selected form the group consisting of: allowing access to the device or a function or a file thereof, forbidding access to the device or a function or a file thereof, dimming a display of the capture device, brightening a display of the capture device, turning a video on or off, blocking a person other than a user from gazing at a screen of the display device.

13. A method for operating a capture device, comprising:
   obtaining a high resolution image or a low resolution image;
   obtaining a state of a three-way switch;
   subject to the state being an "Off" state, disabling all output from the capture device;
   subject to the state being a "Stream" state, enabling all output from the capture device, including the high resolution image; and
   subject to the state being an "Auto" state, enabling only metadata output from the capture device, and disabling outputting images from the device.

14. The method of claim 13, further comprising:
   turning on a LED when the switch is in "Stream" state; and
   turning off the LED when the switch is in "Off" state or "Auto state".

15. The method of claim 13, wherein in the "Off" state a physical shutter covers the camera ensemble of part thereof.

16. The method of claim 13, wherein the "Auto" state is a default state of the three-way switch.

17. The method of claim 13, wherein the "Off" state is physically located as a middle state of the three-way switch, between the "Auto" state and the "Stream" state.

18. The method of claim 13, wherein the metadata is used for an operation selected form the group consisting of:

allowing access to the device or a function or a file thereof, forbidding access to the device or a function or a file thereof, dimming a display of the capture device, brightening a display of the capture device, turning a video on or off, blocking a person other than a user from gazing at a screen of the display device.

* * * * *